United States Patent [19]

Tamamori et al.

[11] Patent Number: 4,678,241
[45] Date of Patent: Jul. 7, 1987

[54] EQUALIZER DISCHARGE VALVE FOR A RAILROAD CAR AIR BRAKE SYSTEM

[75] Inventors: Hideo Tamamori, Kobe; Mitsuhiro Ikeda, Amagasaki, both of Japan

[73] Assignee: Nippon Air Brake Co., Ltd., Kobe, Japan

[21] Appl. No.: 838,214

[22] Filed: Mar. 10, 1986

[30] Foreign Application Priority Data

Mar. 11, 1985 [JP] Japan .................................. 60-49062
Mar. 11, 1985 [JP] Japan .................................. 60-49063

[51] Int. Cl.$^4$ ............................................. B60T 11/34
[52] U.S. Cl. ......................................... 303/33; 303/54; 303/81; 303/86
[58] Field of Search ........................ 303/33, 35, 36, 37, 303/38, 39, 40, 45, 46, 48, 50–56, 57–83, 84, 86; 137/112

[56] References Cited

U.S. PATENT DOCUMENTS

| | | | |
|---|---|---|---|
| 2,992,861 | 7/1961 | Hursen | 303/33 |
| 3,272,565 | 9/1966 | Wilson | 303/36 X |
| 3,504,950 | 4/1970 | McClure | 303/35 |
| 4,025,126 | 5/1977 | Wilson | 303/36 X |
| 4,354,518 | 10/1982 | Kuroda et al. | 137/112 |
| 4,375,303 | 3/1983 | Tamamori | 137/112 X |
| 4,509,801 | 4/1985 | Newton et al. | 303/36 X |
| 4,533,185 | 8/1985 | Krause | 303/68 X |
| 4,558,907 | 12/1985 | Reiss et al. | 303/36 X |
| 4,585,279 | 4/1986 | Doto | 303/68 X |
| 4,586,755 | 5/1986 | Worbois | 303/68 X |

Primary Examiner—Douglas C. Butler
Attorney, Agent, or Firm—G. P. Baier

[57] ABSTRACT

An equalizer discharge valve for use on a railroad air brake system includes a valve housing having an equalizer chamber formed therein above a brake pipe chamber and separated by a piston, diaphragm configuration. The diaphragm is sealed on the outer circumference by the connection to the housing and on the inner circumference by the connection to the piston. A connecting passage formed in the piston has a check valve disposed therein such that fluid pressure can only flow from the equalizer chamber to the brake pipe chamber. An exhaust valve, disposed between the brake pipe chamber and an exhaust chamber, vents the brake pipe chamber when opened as corresponds to selected venting of the equalizer chamber fluid pressure. A back pressure chamber and piston configuration is formed above the equalizer chamber such that fluid pressure from the exhaust chamber can be communicated thereto to counterbalance the force on the piston exerted from the brake pipe side during an exhaust operation.

9 Claims, 9 Drawing Figures

PRIOR ART

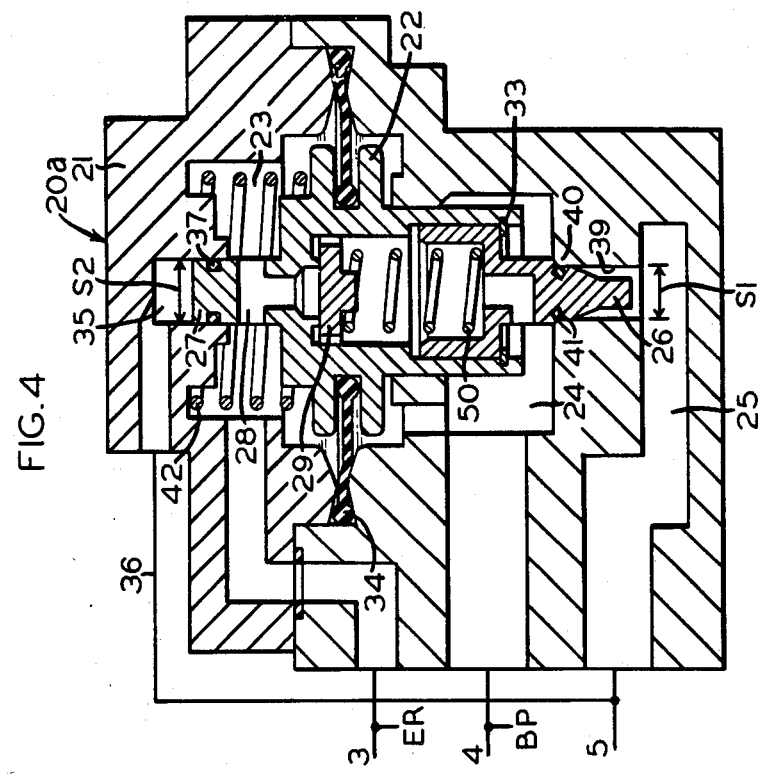
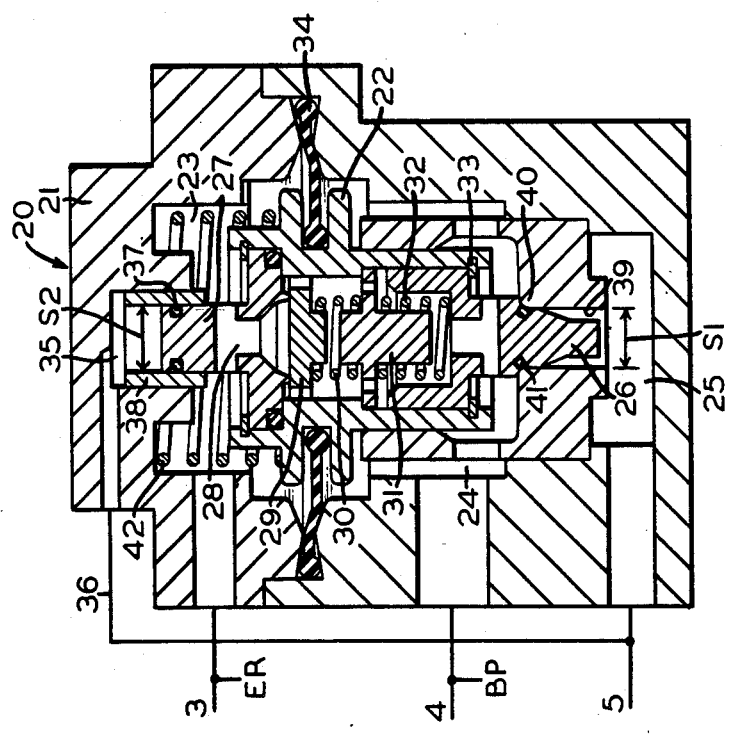

EQUALIZER DISCHARGE VALVE FOR A RAILROAD CAR AIR BRAKE SYSTEM

This invention relates to a railroad car equalizer discharge valve in which, characteristically, there is a fluid communication path formed within a piston which connects an equalizer chamber with the brake pipe chamber, there further being a check valve disposed therebetween which opens in the direction toward the brake pipe chamber. Functionally, the equalizer discharge valve used with the braking system of railroad cars provides the ability for the operator to set the brake command signal which can be defined as the amount of fluid pressure released from the equalizer air reservoir to effect the desired amount of braking. Typically, such brake systems using an equalizer discharge valve further include a brake valve which the operator uses to select the desired function (e.g., release, application, emergency), a control valve, the brake pipe and an original air reservoir and an equalizer air reservoir. Ideally, when the brake valve is moved to the application position, fluid pressure is exhausted from the equalizer air reservoir in the same volume as is exhausted from the brake pipe which extends through the entire train, the operation of the equalizer discharge valve in conjunction with the brake valve serving to equalize the fluid pressure values in the equalizer air reservoir and the brake pipe. In practice, however, such ideal results are not attainable. One problem experienced by the techniques of the prior art is that, since the equalizer air reservoir is of such a significantly lower volume than the brake pipe, the equalizer air reservoir is decompressed much more rapidly than the brake pipe. Additionally, since the equalizer discharge valve, according to the prior art, exhibits an equalizer chamber adjacent one side of a piston, and a brake pipe chamber adjacent the opposite side of the piston, an undesired pressure differential results which stresses the piston and has been known to cause fluid leakage around the circumference of the piston. The effect of this leakage problem on the overall braking system in turn results in a further problem; that being that the brake command signal expected by the operator is in fact not the fluid pressure level present in the brake pipe since the leakage previously mentioned causes some fluid pressure from the brake pipe to flow into the equalizer chamber, thereby changing the balance between the desired fluid pressure level in the equalizer air reservoir and that in the brake pipe.

SUMMARY OF THE INVENTION

It is, therefore, an object of the invention to provide an equalizer discharge valve for a railroad car air brake system which prevents the flow of fluid pressure from a brake pipe chamber to an equalizer chamber.

It is a further object of the invention to provide such an equalizer discharge valve which accurately translates the selected brake command signal to the equivalent fluid pressure level in the brake pipe.

An even further object of the invention is to provide such an equalizer discharge valve which provides a brake command signal to the brake pipe dependent solely on the brake valve setting and not on the length of the brake pipe.

It is yet another object of the invention to provide such an equalizer discharge valve having a connecting path formed in a piston separating an equalizer chamber from a brake pipe chamber and a check valve which allows fluid flow only in the direction from the equalizer chamber to the brake pipe chamber.

Still another object of the invention is to provide such an equalizer discharge valve which exhibits a back pressure chamber and back pressure piston disposed adjacent the equalizer chamber and in communication with the exhaust chamber in a manner so that an equal force is directed toward the equalizer chamber as is directed toward the brake pipe chamber by the exhaust operation.

Yet another object of the invention is to provide such an equalizer discharge valve wherein the back pressure chamber is pressurized via a passageway formed in the housing between the exhaust chamber and the back pressure chamber.

Briefly, the invention consists of a valve housing having a piston movable therein. The piston is secured to the housing in a flexible manner by means of a diaphragm which is sealingly connected on the outer circumference to the housing and on the inner circumference to the piston. An equalizer chamber is disposed adjacent to one side of the piston while a brake pipe chamber is disposed adjacent to the opposite side of the piston. A connecting path is formed through the piston with a check valve disposed therein to allow fluid flow only from the equalizer chamber to the brake pipe chamber. An exhaust valve, disposed between the brake pipe chamber and an exhaust chamber, vents the fluid pressure from the brake pipe when opened as occurs when the fluid pressure in the equalizer chamber is reduced to effect the desired amount of braking. A back pressure chamber and piston disposed adjacent the equalizer chamber, are connected to the exhaust chamber such that an equal amount of force as is acting against the one side of the piston can be exerted from the other side of the piston.

BRIEF DESCRIPTION OF THE DRAWINGS

FIG. 3 is an elevational view in section of an equalizer discharge valve constructed in accordance with the invention.

FIG. 4 is an elevational view in section of an equalizer discharge valve constructed in accordance with an alternate embodiment of the invention.

DESCRIPTION AND OPERATION

Figure 6:
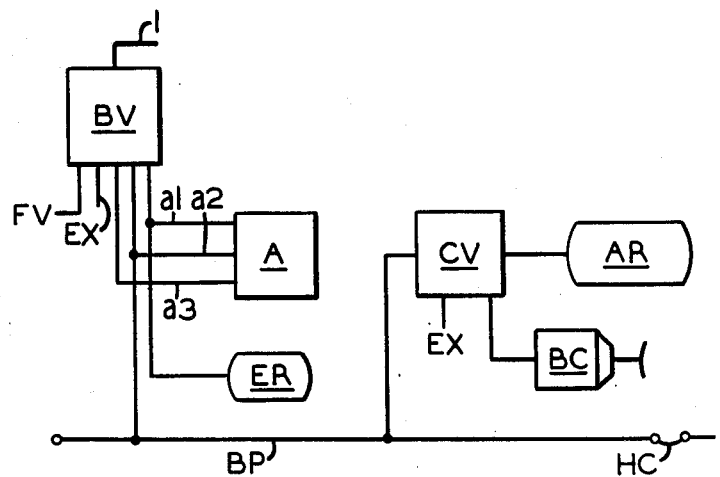
FIG. 6 is a diagrammatic representation in block diagram form of a portion of a railroad air brake system.

A railroad car air brake system having an equalizer discharge valve is shown in block diagram form in FIG. 6 and will be first described herein. As seen in FIG. 6, the equalizer discharge valve is represented as block A and is shown having three fluid pressure connections a1, a2, and a3. The first connection a1 is connected to the brake valve BV and the equalizer reservoir ER simultaneously. The brake valve BV has a handle 1 which is moved by the train operator to various positions to select braking functions such as release, application, and emergency braking. An exhaust port EX and a feed valve FV are connected to the brake valve BV in the conventional manner. The second connection a2 of the equalizer discharge valve A is connected simultaneously to the brake valve BV and the brake pipe BP which extends through the entire length of the train, there being hose couplings HC which bridge the brake pipe BP between consecutive railroad cars. Also connected to the brake pipe BP in a conventional manner are the control valve CV, which also has an exhause port EX, an air reservoir AR, and the brake cylinder BC.

Figure 1:
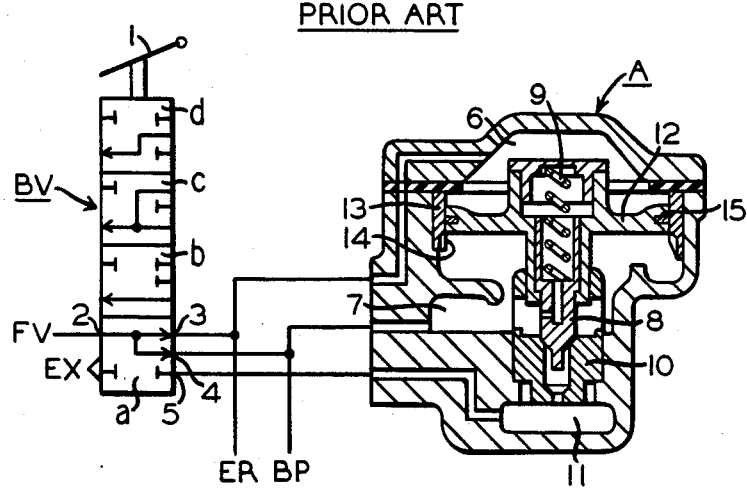
FIG. 1 is an elevational view partly in section of an equalizer discharge valve constructed in accordance with the teachings of the prior art.

As now seen in FIG. 1, the equalizer discharge valve A and a diagrammatic view of the brake valve BV are shown to illustrate the teachings of the prior art. FIG. 1 illustrates the situation in which the brake valve BV has been moved to the release position designated a, in which the brake cylinder is loose or released. In this situation, the fluid pressure comes from the original air reservoir (not shown), passes through the feed valve FV, and is adjusted to a certain pressure value (typically, 28 psi) and then supplied to an input port 2 of the brake valve BV. Within the brake valve, the release position a establishes a path from the input port 2 to a first outlet port 3 and a second outlet port 4. From the first outlet port 3, fluid pressure then flows to an equalizer chamber 6 formed in the equalizer discharge valve A and the equalizer reservoir ER. From the second outlet port 4, fluid pressure flows to a brake pipe chamber 7 also formed in the equalizer discharge valve A, and the brake pipe BP. The equalizer chamber 6 and the brake pipe chamber 7 are formed on opposite sides of a movable piston 12 disposed in the equalizer discharge valve A. With equal pressure in such two chambers 6,7, an exhaust valve formed partly on a portion of the piston 12 extending into the brake pipe chamber 7 is pushed onto the valve base 10 by its own weight and the influence of valve spring 9, thereby sealing the brake pipe chamber 7 from an exhaust chamber 11. Thus, the situation in which the brake pipe BP is pressurized to the certain pressure (e.g., 28 psi) is the brake release state. In this state, the control valve is loose and decompresses the brake pipe BP and pressurizes the air reservoir AR to the specified pressure. The brake cylinder BC is loose in the state in which the brake pipe BP is decompressed.

To operate the brake in this released state, first, the brake valve BV is switched to the braking position c and the equalizer air reservoir ER is decompressed. When the degree of decompression reaches the desired value, the brake valve BV is placed in the overlapping position b. In other words, if the brake valve BV is in the braking position c, the port 4 is closed, and equalizer chamber 6 associated with the equalizer air reservoir ER and the equalizer discharge valve A are in communication with the exhaust outlet EX and with the exhaust chamber 11 via a small passage inside the brake valve BV. Consequently, the equalizer air reservoir ER and the equalizer chamber 6 are decompressed, so that the piston 12 rises because of the pressure difference in the upper and lower chambers and the exhaust valve 8 separates from the valve base 10 so that the brake pipe chamber 7 is in communication with the exhaust chamber 11, and consequently the brake pipe BP is decompressed via exhaust chamber 11. At this time, when decompression of the equalizer air reservoir ER, the capacity of which is constant, reaches the value desired by the driver, the brake valve BV is placed in the overlapping position b. In the overlapping position b, the ports 3 and 4 are closed and only port 5 is in communication with the exhaust outlet EX. Therefore, when the pressure in the brake pipe BP, which was decompressed in the brake position C, reaches almost that of the equalizer air reservoir ER, the piston 12 descends by its own weight, the exhaust valve 8 is closed and the decompression of the brake pipe BP ceases.

As a result of the decompression of the brake pipe BP, the control valve CV adjusts the pressure of the air in the air reservoir AR to correspond to the decompression of the brake pipe BP.

To release the brake, the brake valve BV is returned to the release position a. Consequently, the system returns to the pressurization conditions as previously described for the state. At the time of the release, since the capacity of the equalizer reservoir ER is significantly less than that of the brake pipe and is, in fact, constant whereas the capacity of the brake pipe BP changes as a function of the length of the train, the equalizer reservoir ER and the equalizer chamber 6 are pressurized more rapidly than the brake pipe BP and brake pipe chamber 7. According to the prior art, this deficiency is corrected by use of a leak groove 14 which is formed of a greater diameter within the housing than the piston 12 occupies such that, with the piston 12 moved downward by the higher pressure in the equalizer chamber 6, the fluid pressures between the equalizer chamber 6 and brake pipe chamber 7 can be equalized. As shown in FIG. 1, the prior art provides the means for equalizing the respective fluid pressures across the piston 12 by use of a bleed passage 14 formed at the lower portion of a bushing 13. At other times, when the equalizer chamber 6 and the brake pipe chamber 7 are sealed against one another, the prior art shows an annular seal 15 disposed on the piston 12 and unsecured to the housing.

In the released status (moving status), to operate the emergency brake, the brake valve BV is switched to the emergency braking position d. At this time, the air inside the brake pipe BP and the brake pipe chamber 7 of the equalizer discharge valve A is suddenly exhausted from the exhaust outlet EX, traversing the large passage inside the brake valve BV. In this manner, as a result of the pressure of the equalizer air reservoir ER, which was seated in the equalizer chamber 6, the piston 12 descends, compressing the spring 9, with the exhaust valve 8 still in contact with the base 10; then the bleed passage 14 at the lower end of the bushing 13 opens, and from this bleed passage 14, the air of the equalizer air reservoir ER flows in the brake pipe chamber 7 and is exhausted from the brake valve BV together with the air in the brake pipe BP. As a result of this sudden decompression in the brake pipe BP, the control valve CV effects an immediate braking action and supplies highpressure air to the brake cylinder BC so that the emergency brake on the car can operate.

Figure 2:
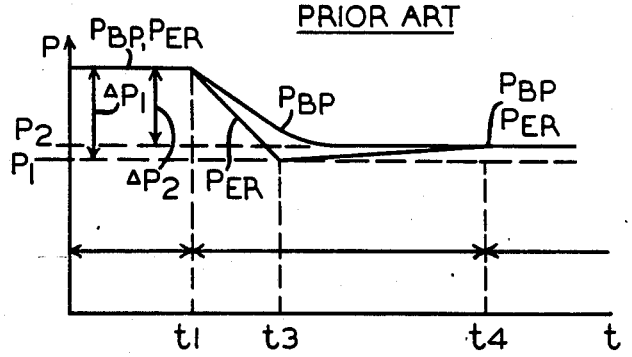
FIG. 2 is a graphical representation of the pressure versus time characteristics for the equalizer discharge valve shown in FIG. 1.

This sealing approach between the two chambers 6,7 causes the following problem: during the brake response time, that is, during decompression of the equalizer reservoir ER, the brake valve BV is located in the braking position c which is the position in which the equalizer reservoir ER is decompressed by the desired amount (e.g., to pressure P1 shown at time $t_3$ in FIG. 2) and when the brake valve BV is placed in the overlapping position b, to maintain that pressure P1 in the equalizer reservoir ER, the air inside the brake pipe BP, in the process of decompressing flows into the equalizer chamber 6 from along the outer circumference of the piston 12 because the brake pipe pressure $P_{BP}$ is higher than the equalizer reservoir pressure $P_{ER}$. Since the volume of the equalizer reservoir ER is constant, the pressure $P_{ER}$ will rise at this time. Therefore, the equalizer reservoir pressure $P_{ER}$ is no longer at the level P1 but assumes the level P2 shown in FIG. 3. The pressure P2 is the brake pipe pressure $P_{BP}$ when the exhausting movement of the equalizer discharge valve A is completed and the exhaust valve 8 is reseated on the base 10. In other words, since the decompression, delta P1 of the equalizer reservoir ER is the brake command signal, with the equalizer discharge valve A of the prior art, only a response which is shown as delta P2 in FIG. 2 is attainable, which response is less than the brake command signal set by the operator. As further seen in FIG. 2, t1 is the time the brake valve BV is moved from the released position to the braking position c, and t4 is the time the pressure $P_{BP}$ becomes equal to $P_{ER}$. Therefore, the pre-set control operation in which the decompression of the equalizer reservoir ER is added previously by the pressure rising amount (P2-P1) of the equalizer reservoir ER, or a compensation control operation in which the decompression of the equalizer reservoir ER must be repeated two or three times, is necessary, and these pre-set control or compensation control operations require quite a lot of skill, because the pressure increase of the equalizer reservoir ER changes as a function of the length of the brake pipe BP (which changes as a function of the number of cars connected) and/or the decompression of the equalizer reservoir ER.

As seen in FIG. 3, a first embodiment of the equalizer discharge valve A, herein disclosed, includes a valve housing 21 having a piston 22 movable therein. The piston is fixed within the housing in a freely moving manner by use of a diaphragm 34 which is secured on its outer circumference to the housing and on the inner circumference to the piston 22. A brake pipe chamber 24 is formed facing the lower side of the piston 22. Formed in the housing 21 below the brake pipe chamber 24 is an exhaust chamber 25, which is in communication with the brake pipe chamber 24 over an exhaust passageway 39 when an exhaust valve shown generally as reference 26,40 is in the open position. The piston 22 supports the exhaust valve 26,40 on its lower portion, while the exhaust valve seat 40 is fixedly secured within the lower portion of the housing 21, the exhaust valve seat 40 being formed at the upper entrance of the exhaust passageway 39. The portion of the exhaust valve 26,40 extending into the exhaust passageway 39 has a force exerted thereon when the exhaust chamber 25 is pressurized, such force being a function of the pressure in the exhaust chamber 25 and the area of the exhaust valve portion exposed to that pressure, such area being shown as S1 in FIG. 2.

In a corresponding manner to the force indirectly exerted on the piston 22 from the brake pipe chamber-/exhaust chamber 24/25 side, a counterbalancing force is exerted from the equalizer chamber side of the piston 22. For this purpose, a back pressure chamber 35 having a back pressure piston 27 movable therein is disposed adjacent the equalizer chamber 23 such that, fluid pressure connected to the back pressure chamber 35 from the exhaust chamber 25 exerts a force from the equalizer chamber side of piston 22 of substantially equivalent magnitude to that exerted from the brake pipe chamber side. As seen in FIG. 3, the surface area S2 of the back pressure piston 27 which is exposed to fluid pressure from the exhaust chamber 25 is substantially equivalent to the area S1 of the portion of the exhaust valve 26,40 on which the fluid pressure from the exhaust chamber 25 also is exerted. The back pressure chamber 35 connects to the exhaust chamber 25 over an exhaust line 36. As shown in FIG. 3, a gasket 37 and bushing 38 surround the back pressure piston 27.

Formed within the piston 22 is a connecting path 28 which can, at times, connect the equalizer chamber 23 with the brake pipe chamber 24. A check valve 29 is disposed in the connecting path in such a manner that fluid pressure can flow only from the equalizer chamber 23 to the brake pipe chamber 24. Therefore, by use of the check valve 29 and the flexible diaphragm 34, fluid pressure can only flow from the equalizer chamber 23 to the brake pipe chamber 24 through the connecting path 28 and not vice versa, and further, cannot flow in either direction around the circumference of the piston 22.

Associated with the check valve 29 is a first valve spring 30 which has a weak spring constant thereby allowing the check valve 29 to open relatively soon in relation to a differential in pressure between the equalizer chamber 23 and the brake pipe chamber 24, the operation of which will be described hereinafter in further detail. The first valve spring 30 is supported within the piston 22 by a first support member 31 which is in turn acted on by a second spring 32 which seats within a spring pocket formed within the upper portion of the exhaust valve body 26. The exhaust valve body 26 is supported within the connecting path 28 formed in the piston 22 by an annular ring 33 which prevents the exhaust valve body 26 from extending downward out of the connecting path 28 portion of the piston 22.

A return spring 42 is disposed within the equalizer chamber 23 and exerts a force downward on the piston 22, thereby preventing the piston from remaining in the top position and always discharging. It is also possible to eliminate the return spring 42 since the weight of the piston 22 itself could serve the same purpose.

Figure 5:
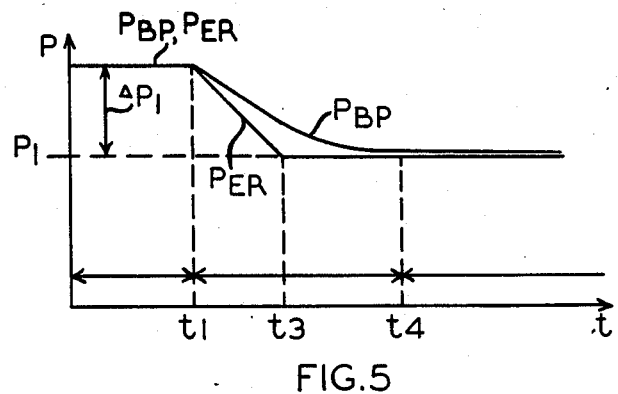
FIG. 5 is a graphical representation of the pressure versus time characteristics for the equalizer discharge valve shown in FIGS. 3 and 4.

In operation, to apply a desired amount of braking, the train operator moves the handle 1 to the brake application position c so that a desired amount of fluid pressure, delta P1 from FIG. 5, is exhausted from the equalizer chamber 23, this pressure, delta P1 corresponding to the brake command signal. The brake valve BV will be placed in the overlapped position b when the desired amount of fluid pressure has been exhausted from the equalizer chamber 23. At this time, the fluid pressure in the brake pipe BP and brake pipe chamber 24 will be higher thereby causing piston 22 to rise, which effects an opening of the exhaust valve 26,40. With the exhaust valve 26,40 open, the fluid pressure in the brake pipe chamber 24 will be exhausted. As shown in FIG. 5, the pressure in the equalizer reservoir $P_{ER}$ will reach the desired level at time $t_3$ which is sooner in time than the time $t_4$ that it takes for the pressure in the brake pipe $P_{BP}$ to be so reduced. Additionally, since the diaphragm 34 is on the outer circumference of the piston 22, there is no bleed pressure from the brake pipe chamber 24 to the equalizer chamber 23 from around the piston 22 or from the connecting path 28 which is closed by the check valve 29. Therefore, the pressure in the brake pipe BP, when the exhaust motion of the equalizer discharge valve A is ended and the exhaust valve 26,40 reseats, is substantially equivalent to the pressure in the equalizer reservoir ER which is essentially the brake command signal set by the operator.

During the exhausting motion of the equalizer discharge valve A, pressure flowing into the exhaust chamber 25 from the brake pipe chamber 24 exerts a force on the portion of the exhaust valve body 26 which extends into the exhaust passageway 39. This force is a function of the amount of pressure being exhausted and the surface area S1 so exposed to that pressure. Since the exhaust valve body 26 is connected to the piston 22, it is necessary to counterbalance this undesired force on the piston. Therefore, the pressure in the exhaust chamber 25 is at this time communicated to the back pressure chamber 35 over the exhaust line 36 to act on the back pressure piston 27 which has a surface area S2. Since the surface area S2 is substantially equivalent to the surface area S1 and the same exhaust pressure is exerted on both surface areas, the overall effect on the piston 22 is negligible.

To release the brake, the operator moves the brake valve BV to the release position a. At this time, fluid pressure from the original air reservoir (not shown) passes through the feed valve FV, through inlet port 2 of the feed valve FV, through outlet ports 3,4 to pressurize the equalizer chamber 23, and the brake pipe chamber 24, as well as the equalizer reservoir ER and the brake pipe BP. Since the equalizer chamber 23 and equalizer reservoir ER are of significantly lower capacity than the brake pipe ER, the equalizer chamber 23 is filled first. The piston 22 will descend and the check valve 29 will open allowing the brake pipe chamber 24 to reach pressurization in equilibrium with the equalizer chamber 23.

As seen in FIG. 4, a second embodiment of the equalizer discharge valve A is shown having a number of elements identical to those shown in FIG. 3 and, consequently, the reference numbers are repeated and explanations omitted therefor.

The manner in which this equalizer discharge valve 20a differs from the equalizer discharge valve 20 in FIG. 3 is that there is one valve spring 50 instead of the first and second valve springs 30, 32, and the middle support element 31 between the exhaust valve 26,40 and the check valve 29. Therefore, in this equalizer discharge valve 20a, the opening response pressure of the check valve 29 differs slightly. The equalizer discharge valve 20, 20a of the first and second embodiments are generally used to replace the equalizer discharge valve A of the brake system illustrated in FIGS. 1 and 2. In other words, the equalizer chamber 23 is connected to the equalizer reservoir ER and the port 3 of the brake valve BV, and the brake pipe chamber 24 is connected to the brake pipe BP and the port 4 of the brake valve BV, and the exhaust chamber 25, and the back pressure chamber 35 are connected to the port 5 of the brake valve BV.

The operation of the equalizer discharge valve shown in FIG. 4 is the same as described for the first embodiment, the differences affecting only the manufacture and maintenance features.

Figure 7:
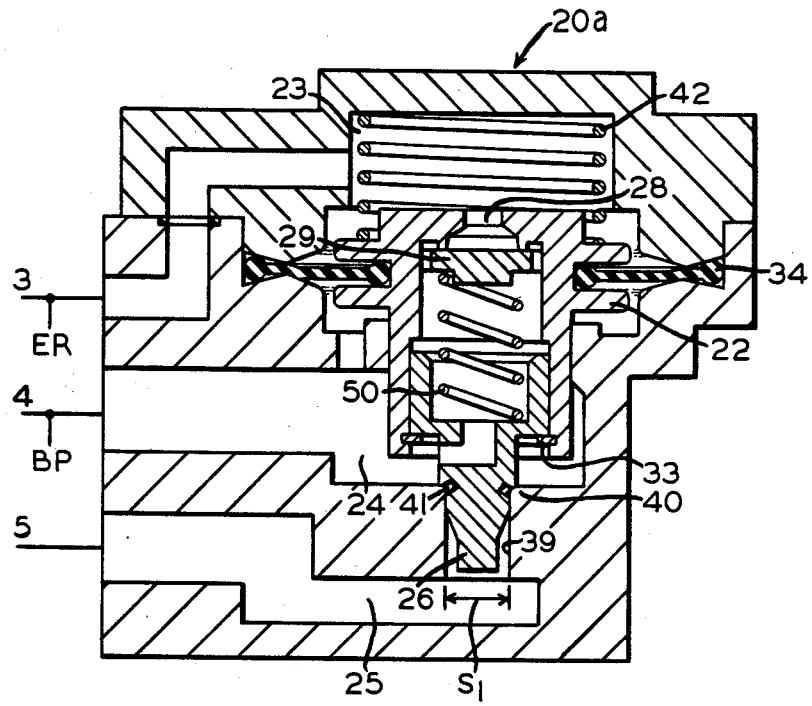
FIG. 7 is an elevational view in section of an equalizer discharge valve constructed in accordance with another alternate embodiment of the invention.

As seen in FIG. 7, a third embodiment of an equalizer discharge valve A is presented. The structure of this embodiment is one of which the back pressure piston and chamber configuration 27,35 are removed, the remaining elements being the same as shown in FIG. 4.

According to this embodiment, the exhaust valve body 26 is pushed onto the exhaust valve base 40 by the brake pipe pressure $P_{BP}$ the power of such pushing motion being determined by the relationship $P_{BP} \times S1$ during the brake release condition in which the equalizer reservoir pressure $P_{ER}$ and the brake pipe pressure $P_{BP}$ are the specified value of approximately 28 psi. Therefore, the exhaust valve 26,40 does not immediately open as a result of the pressure difference between the brake pipe pressure $P_{BP}$ and the equalizer reservoir pressure $P_{ER}$ which occurs upon initiation of the brake application condition.

Figure 8:
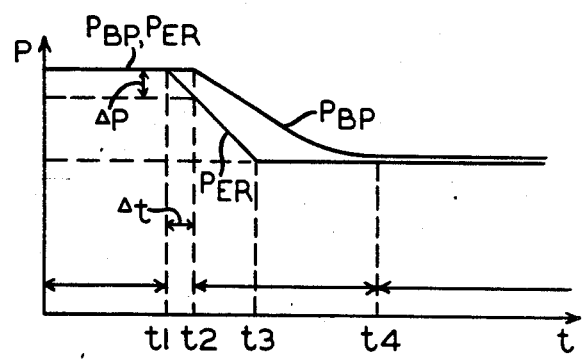
FIG. 8 is a graphical representation of the pressure versus time characteristics of the equalizer discharge valve shown in FIG. 7.

The decompression of the brake pipe BP does not start until the lifting power of the piston 22 becomes greater than the power corresponding to the relationship $P_{BP} \times S1$. In other words, as shown in FIG. 8, after the pressure difference between the brake pipe pressure $P_{BP}$ and the equalizer reservoir pressure $P_{ER}$ becomes greater than delta P, the exhaust valve 26,40 opens and the braking operation begins. Therefore, the brake works from time $t_2$, which is delayed by delta t from the time $t_1$, which is when the equalizer reservoir ER begins to exhaust fluid pressure. In the previous embodiments, the use of the back pressure piston and chamber configuration prevented this time delay caused by such power exerted on the exhaust valve.

Figure 9:
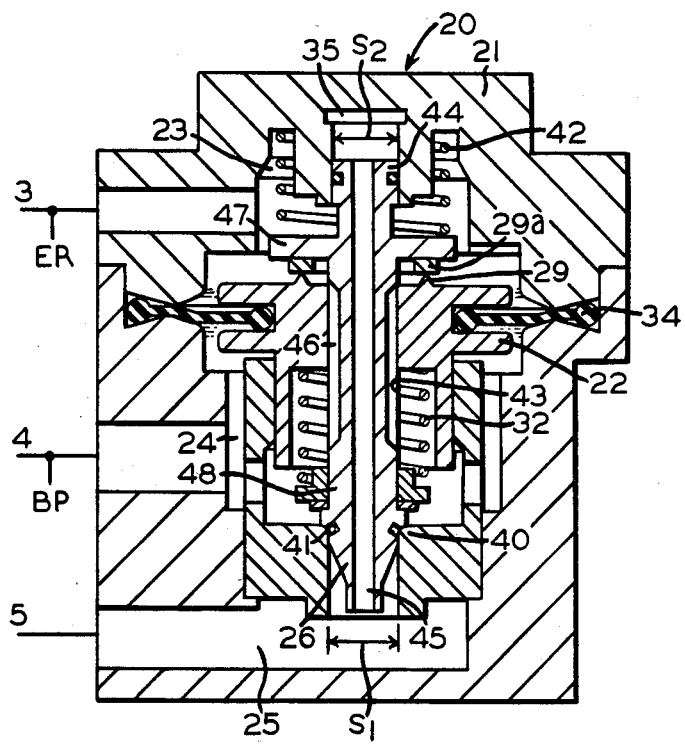
FIG. 9 is an elevational view in section of an equalizer discharge valve constructed in accordance with a third alternate embodiment of the invention.

A fourth embodiment of the equalizer discharge valve is illustrated in FIG. 9, with a substantial number of elements being common with the previous embodiments.

As seen in FIG. 9, the piston 22 has formed thereon, the valve base 29 for the check valve 29,29a with the valve body 29 being connected to a flange portion 47 formed on a tubular body member 48 which extends through the piston 22 and further extends into the equalizer chamber 23 and the brake pipe chamber 24.

In FIG. 9, 32 is the valve spring which acts between the piston 22 and the exhaust valve 26,40 to urge the exhaust valve 26,40 toward the exhaust valve base 40. The exhaust valve body 26 is formed at the lower end of the tubular body member 48 while the back pressure piston 27 is formed at the opposite end. Corresponding to this back pressure piston 27, there is a back pressure chamber 35 which, unlike the previous embodiments, is not pressurized over an external connection. Instead, the back pressure chamber 35 communicates with the exhaust chamber 25 through an internal passageway 45 formed coaxially through the tubular body member 48. Similar to the previous embodiments, the surface area S2 of the back pressure piston 27 is substantially equivalent to the surface area S1 of the exhaust valve body 26. On a portion of the outer circular surface of the tubular body member 48, there is a vertical groove, which can also be a number of grooves 33, which form the connecting passage between the equalizer chamber 23 and brake pipe chamber 24 when the check valve 29 is opened.

In operation, the equalizer discharge valve shown in FIG. 9 is the same as was described for the previous three embodiments and will not be herein repeated.

Although the hereinabove embodiments of the invention constitute preferred forms, modifications can be made thereto without departing from the scope of the invention as detailed in the appended claims.

As an example, the equalizer discharge valve can be effective where the equalizer reservoir ER, the brake pipe BP, and the equalizer discharge valve are all connected in series and fluid pressure is fed to the brake pipe BP via the check valve 29.

We claim:

1. An equalizer discharge valve for use on a railroad air brake system having an equalizer reservoir, a brake valve, and a brake pipe extending through each railroad car of the train, said equalizer discharge valve comprising:
   (a) a valve housing;
   (b) a piston movable within a chamber formed in said valve housing;
   (c) a diaphragm connected to said piston on the inner circumference and connected to said valve housing on the outer circumference;
   (d) said piston and said diaphragm dividing said chamber into an equalizer chamber on one side of said piston and a brake pipe chamber on the opposite side of said piston;
   (e) a connecting passageway formed through said piston;
   (f) a check valve partially formed on a portion of said piston adjacent said connecting passageway, said check valve being effective such that fluid pressure can flow only from said equalizer chamber to said brake pipe chamber when said check valve is open;
   (g) an exhaust chamber disposed in said valve housing below said brake pipe chamber; and
   (h) an exhaust valve formed between said brake pipe chamber and said exhaust chamber, said exhaust valve being effective such that, upon a preselected reduction in fluid pressure in said equalizer chamber, said piston rises and opens said exhaust valve to exhaust an amount of fluid pressure from said brake pipe chamber substantially equivalent to such preselected reduction of fluid pressure from said equalizer chamber.

2. An equalizer discharge valve as set forth in claim 1, further comprising a back pressure chamber formed in said valve housing above said equalizer chamber, and a back pressure piston movable within said back pressure chamber under the influence of fluid pressure communicated from said exhaust chamber.

3. An equalizer discharge valve as set forth in claim 2, wherein the surface area of said back pressure piston exposed to such exhaust chamber fluid pressure is substantially equivalent to the surface area of an exhaust valve body portion of said exhaust valve exposed simultaneously to such exhaust chamber fluid pressure.

4. An equalizer discharge valve as set forth in claim 1, wherein said diaphragm is disc-shaped having a coaxially formed inner opening to which such inner circumference is associated.

5. An equalizer discharge valve as set forth in claim 2, wherein said back pressure chamber, said equalizer chamber, said brake pipe chamber and said exhaust chamber are arranged in a vertically stacked manner with said equalizer chamber formed above said brake pipe chamber.

6. An equalizer discharge valve as set forth in claim 1, wherein said exhaust valve includes an exhaust valve body attached to said piston for coincident movement therewith and an exhaust valve seat formed on an exhaust passageway extending between said brake pipe chamber and said exhaust chamber.

7. An equalizer discharge valve as set forth in claim 1, wherein said check valve includes a check valve body disposed within said connecting passageway and held against a check valve seat formed on said piston by a check valve spring, said check valve spring being supported by a spring pocket disposed in said connecting passageway such that a spring force can be exerted on said check valve body to maintain closure of said check valve under conditions wherein fluid pressure in said brake pipe chamber is at least equal to fluid pressure in said equalizer chamber.

8. An equalizer discharge valve as set forth in claim 2, wherein such fluid pressure communicated from said exhaust chamber to said back pressure chamber is so communicated over an exhaust passageway formed internally of said valve housing.

9. An equalizer discharge valve as set forth in claim 8, wherein said exhaust passageway is formed coaxially through said piston.

* * * * *